United States Patent [19]
DiFilippo

[11] Patent Number: 6,078,052
[45] Date of Patent: Jun. 20, 2000

[54] SCINTILLATION DETECTOR WITH WAVELENGTH-SHIFTING OPTICAL FIBERS

[75] Inventor: Frank P. DiFilippo, University Heights, Ohio

[73] Assignee: Picker International, Inc., Highland Hts., Ohio

[21] Appl. No.: 08/921,234

[22] Filed: Aug. 29, 1997

[51] Int. Cl.[7] .................................................. G01T 1/20
[52] U.S. Cl. ........................................ 250/367; 250/368
[58] Field of Search ...................................... 250/367, 368

[56] References Cited

U.S. PATENT DOCUMENTS

| | | | |
|---|---|---|---|
| 4,437,007 | 3/1984 | Koslow et al. | 250/367 |
| 5,103,099 | 4/1992 | Bourdinaud et al. | 250/368 |
| 5,391,878 | 2/1995 | Petroff | 250/367 |
| 5,600,144 | 2/1997 | Worstell . | |
| 5,675,151 | 10/1997 | Oka et al. | 250/368 |
| 5,780,856 | 7/1998 | Oka et al. | 250/367 |
| 5,783,829 | 7/1998 | Sealock et al. | 250/367 |

OTHER PUBLICATIONS

IEEE "Scintillator Crystal Readout with Wavelength–Shifting Optical Fibers", WIlliam Worstell, Steven Doulas, Olof Johnson, Cheng–Ju Lin, Mar. 1995, pp. 1869–1873.

*Primary Examiner*—Constantine Hannaher
*Attorney, Agent, or Firm*—Renner, Otto, Boisselle & Sklar, LLP

[57] ABSTRACT

A radiation detector includes wavelength-shifting optical fibers which are selected and arranged to capture a greater percentage of visible photons through the use of two or more different color stages of wavelength-shifting fibers. A primary set of optical fibers contains a first wavelength shifting optical fiber tuned to absorb photons emitted by the detector crystal and to re-emit photons at a longer wavelength. At least some of the re-emitted photons from the primary set of optical fibers are captured and transmitted down the first wavelength shifting optical fiber. A secondary set of optical fibers contains a second wavelength shifting optical fiber tuned to absorb photons emitted by the primary set of optical fibers and to re-emit photons at a still lower frequency. In this way at least some of the photons emitted by the primary set of optical fibers and not transmitted down the first optical fiber are captured and transmitted down the secondary optical fiber. An electro-optical device such as a PMT or photodiode is positioned to detect photons received from at least one end of the first or second wavelength shifting optical fibers and to generate an electrical signal in response.

29 Claims, 2 Drawing Sheets

SCINTILLATION DETECTOR WITH WAVELENGTH-SHIFTING OPTICAL FIBERS

FIELD OF THE INVENTION

The present invention relates to a scintillation detector and to a method for use of a scintillation detector in a gamma camera, and in particular to a scintillation detector and method which utilize wavelength-shifting optical fibers and to cameras using such a detector.

BACKGROUND OF THE INVENTION

Scintillation detectors are used in medicine to detect radiation emitted from a patient as a result of an internally administered radiopharmaceutical or emitted from a source external to the patient. Such detectors are used in many modern medical imaging techniques including computed tomography (CT), single photon emission computed tomography (SPECT), and positron emission tomography (PET). Scintillation detectors include a scintillator, usually a scintillation crystal, and one or more photomultiplier tubes (PMTs) or other photo sensors to locate the origin and determine the energy of a gamma ray or other incident radiation. In the simplest case, when a gamma ray interacts with a scintillation crystal, the gamma ray ejects an energetic electron. If the gamma ray is completely absorbed by a photoelectric interaction, the ejected electron is called a photoelectron. As the ejected electron returns to its rest energy level, one or more photons are emitted. For typical scintillation crystals, the emitted photons are in the visible spectrum (light). Medical imaging systems create an image by recording the location of each flash of visible light in the scintillation crystal and then calculating the location and shape of the source of gamma rays that generated the flashes which may be a tumor or other body part of a patient who has been treated with a radiopharmaceutical.

The resolution of a scintillation detector can be improved by the use of wavelength-shifting optical fibers to capture photons emitted by the scintillation crystal. These fibers can be laid in orthogonal layers of fibers. A PMT connected to the end of each fiber provides a signal when a visible-light photon is captured and propagated through the fiber to the PMT. When the PMTs connected to an orthogonal pair of fibers record photons at the same time, the source of the gamma ray is determined to be at the intersection of the two fibers. One such system is shown in U.S. Pat. No. 5,600,144. While using wavelength-shifting optical fibers can improve the image resolution of a detector, room for improvement in the intrinsic spatial resolution of the detector ($\Delta x$) and the intrinsic energy resolution of the detector ($\Delta E/E$) remains.

In this specification and the accompanying claims the term "radiation" is meant to include any form of high-energy rays. For instance, electromagnetic radiation such as gamma radiation (high energy electromagnetic photons), alpha radiation (helium nuclei), beta radiation (high energy electron radiation) and x-rays. Gamma rays are used throughout as exemplary because they are widely used in medical imaging.

When a gamma ray interacts with a scintillation crystal, the crystal gives off light (photons in the visible spectrum) equally in all directions (isotropically). These photons primarily have a wavelength, $\lambda_0$, which is a characteristic of the crystal material, and particularly, is influenced by dopant chemicals added to the crystal to control the crystal's scintillation properties.

Photons emitted by the scintillation crystal at a wavelength, $\lambda_0$, may strike one of the wavelength-shifting fibers which are adjacent the crystal. If the incoming photons strike the fiber at an angle of incidence which is greater than some critical angle, the photons will be reflected and so will not enter the fiber. On the other hand photons traveling on a path that is at an angle less than the critical angle will enter the fiber. Once inside a wavelength-shifting optical fiber, some of the photons may be absorbed and re-emitted primarily at a longer wavelength, $\lambda_1$. (This shift from an incoming wavelength, $\lambda_0$, to a longer, re-emitted wavelength, $\lambda_1$, is the source of the name "wavelength-shifting fiber".)

Re-emission within the fiber at $\lambda_1$ is also isotropic, and so it results in a change of direction of the photon. Most of the re-emitted photons escape, passing through the wall of the optical fiber. Only those photons that happen to be re-emitted at a sufficiently acute angle with respect to the axis of the fiber will undergo total internal reflection so as to be transmitted the length of the fiber to the PMT or other photosensor at the fiber's end. The rest of the re-emitted photons pass through the walls of the fiber and never reach the photosensor at the end of the fiber.

Because of various well known physical factors, the overall efficiency ($\epsilon$) of delivering photons to the ends of the fiber is limited for this system, typically approaching 8% ($\epsilon \leq 0.08$). The remaining 92% of the re-emitted photons escape and go undetected. This inefficiency is a major factor limiting spatial and energy resolution of a detector using wavelength-shifting optical fibers. The statistical limit of spatial resolution ($\Delta x$) of the detector is inversely proportional to the square root of the number of photons available to be trapped multiplied by the trapping efficiency. Mathematically this may be expressed as:

$$\Delta x \propto 1/(\epsilon N)^{1/2}$$

where N is the number of photons emitted by the crystal and $\epsilon$ is the capturing efficiency. Similarly the energy resolution ($\Delta E/E$) of a detector is inversely proportional to the square root of the number of photons available to be trapped multiplied by the trapping efficiency. Mathematically this may be expressed as:

$$\Delta E/E \propto 1/(\epsilon N)^{1/2}$$

Another factor which affects the efficiency of the absorption process is the bandwidth of the light surrounding $\lambda_0$ and $\lambda_1$. Neither of these two wavelengths is a single value. Instead, the photons emitted by the scintillating crystal and the photons re-emitted by the wavelength-shifting optical fiber have a range of wavelengths centered about these values. Indeed, this is true of all the wavelengths discussed in this specification.

As noted above, $\lambda_0$ is a characteristic of the scintillating crystal related to the atomic structure of the chemicals composing the crystal. Similarly, the wavelength at which the wavelength-shifting optical fiber absorbs, $\lambda_0$, and its re-emission wavelength, $\lambda_1$, are characteristics of the wavelength-shifting optical fiber. Specifically, the change in wavelength ($\lambda_1 - \lambda_0$) in a wavelength-shifting optical fiber is influenced by a dopant in the fiber. Different dopants cause the fiber to absorb photons of different wavelengths and re-emit at other characteristic wavelengths. Suitable dopants include but are not limited to bis-MSB which has an absorption peak at 345 nm and an emission peak at 420 nm (blue) and the fluor K-27 which has an absorption peak at 427 nm and an emission peak at 496 nm (green). Suitable wavelength shifting fibers can be purchased from Bicron Corporation in Newbury Ohio and Kuraray Corp. of Japan.

Because of the bandwidths associated with each of the various wavelengths, it is important to select a wavelength-shifting optical fiber with characteristics that allow it to absorb the visible photons from the scintillating crystal and re-emit photons at a longer wavelength, and it is important that the bandwidths of the absorption and re-emission do not overlap substantially. The reason for this is clear. If the wavelength-shifting optical fiber happens to emit a photon at the high (short) end of its re-emission bandwidth, $\lambda_o - \Delta\lambda = \lambda_3$, and $\lambda_3$ happens to be within the bandwidth that the wavelength-shifting optical fiber will absorb, that photon can be reabsorbed by the optical fiber. If this occurs, that particular photon has only a very small chance of being conducted by the fiber to its end for detection. Accordingly, where there is substantial overlap between the absorption and re-emission wavelengths of the wavelength-shifting optical fiber, the efficiency, $\epsilon$, decreases and the quality of the resulting image is degraded.

SUMMARY OF THE INVENTION

It is a purpose of the present invention to improve the spatial and energy resolution of a scintillation detector by capturing and detecting some of the photons that have heretofore escaped undetected and therefore have not contributed to the resulting image. Moreover it is a purpose of the present invention to provide an emission detector that has improved spatial resolution and energy resolution and a camera using such a detector.

To these and other ends the present invention includes a detector comprising wavelength-shifting optical fibers which are selected and arranged to capture a greater percentage of visible photons than has been done heretofore. This is accomplished through the use of two or more different color stages of wavelength-shifting fibers. A primary set of optical fibers contains a first wavelength shifting optical fiber tuned to absorb photons emitted by a scintillator and to re-emit photons at a longer wavelength. At least some of the re-emitted photons from the primary set of optical fibers are captured and transmitted down the first wavelength shifting optical fiber. A secondary set of optical fibers contains a second wavelength shifting optical fiber tuned to absorb photons emitted by the primary set of optical fibers and to re-emit photons at a still lower frequency. In this way at least some of the photons emitted by the primary set of optical fibers and not transmitted down the first optical fiber are captured and transmitted down the secondary optical fiber. An electro-optical device is positioned to detect photons received from at least one end of the first or second wavelength shifting optical fibers and to generate an electrical signal in response.

In one aspect of the present invention, the radiation detector further includes at least one tertiary set of optical fibers tuned to absorb photons emitted by the secondary set of optical fibers and not internally reflected by them. The tertiary set of fibers absorbs incident photons which escaped the secondary fibers. These photons are re-emitted isotropically and at a longer wavelength, and at least some of them will be internally reflected and so reach a photon detector at the end of the tertiary fiber.

In the context of the specification which follows, it is convenient to speak of the wavelength shifting optical fibers as being grouped in bundles, each bundle including two or more different color stages of wavelength shifting optical fibers, each tuned to absorb some of the photons which escape from the preceding stage and to propagate photons at a longer wavelength. The fibers of each bundle may all have one end connected to a single photo detector, with the opposite ends mirrored, or each fiber may have its own photo detector. Alternatively, one or more photon detectors may be used at each end of each bundle. The optimal association of fibers to photosensors depends on many factors, for example, cost, degree of multiplexing, bandwidth of the photosensors, and the effect of coarse spatial sampling on the spatial resolution.

The foregoing and other features of the invention are hereinafter fully described and particularly pointed out in the claims, the following description and the annexed drawings setting forth in detail certain illustrative embodiments of the invention, this being indicative, however, of but one of the various ways in which the principles of the invention may be employed.

DETAILED DESCRIPTION OF THE INVENTION

Figure 1:
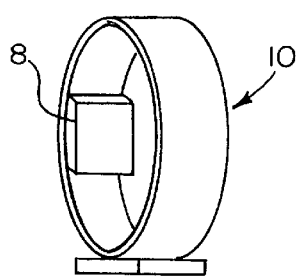
FIG. 1 is a perspective illustration of a gamma camera including a detector mounted on a track to move about a patient.

The present invention provides a detector 8 for detecting gamma rays and suitable for use in a radiation detecting camera 10 illustrated schematically in FIG. 1. The detector 8 (FIG. 2) includes a scintillation crystal 12 which is formed of a radiation sensitive material such as YAP:Ce. (cerium doped yttrium aluminum perovskite), or another conventional material. This material scintillates when hit by a gamma ray, and the emitted photons are in the ultraviolet range of the electromagnetic spectrum at about 347 nm.

Other suitable scintillating materials include but are not limited to crystals of BGO (bismuth germanate ($Bi_4Ge_3O_{12}$)), NaI(Tl) (sodium iodide doped with thallium), and CsI(Na) (cesium iodide doped with sodium).

The crystal 12 (FIG. 2) is generally in the form of a rectangular solid. For example the crystal may be between one quarter (¼) inch and three quarters (¾) inches thick and about nineteen (19) inches wide by twenty-four (24) inches long. One of the major side surfaces of the crystal 12 is covered with a plurality of bundles 14 of optical fibers which extend parallel to each other and to one pair of opposite edges of the crystal. The opposite major side surface of the crystal 12 is covered with a plurality of bundles 16 of optical fibers that extend parallel to the other pair of opposite edges of the crystal. When viewed along a line normal to the major side surfaces of the crystal 12, the bundles 14 and 16 of optical fibers on the two sides form an orthogonal grid, and any point in the crystal can be defined by its position relative to the fibers in this grid.

Each of the plurality of fiber bundles 14 and 16 are identical and only the representative bundle 14 will be described in detail, it being understood that the description applies as well to the bundles 16. In one embodiment, each optical fiber bundle 14 is connected to a photon detecting device such as a photomultiplier tube (PMT) 18 (FIG. 3), the output of which may be processed in a conventional manner to recreate an image of the source of the incident gamma rays. The bundle 14 may be connected to a PMT 18 at one end (FIG. 3), or separate PMTs 18 and 18' may be provided at each end of the bundle (FIG. 4). In the former case the end of the bundle 14 that does not have a PMT may be provided with a mirror (not shown), so that photons initially traveling away from the PMT are reflected and eventually counted.

Instead of photomultiplier tubes 18 and 18', avalanche photodiodes can be used, or hybrid PMTs which have a photocathode with a silicon photodiode at high voltage may be used. Visible light photon counters (VLPCs) can also be used. It is likely that such detectors will be improved over the coming years and others discovered or made economical. It will be understood by those skilled in the art that PMT 18 is exemplary and that the key feature for the photon detector is simply that it reliably count the photons which arrive from the fibers.

Figure 5:
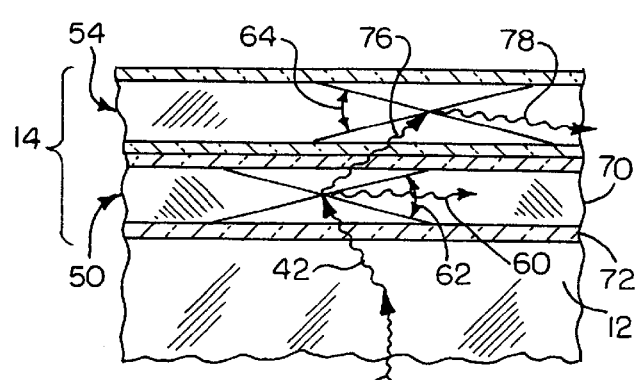
FIG. 5 is an enlarged, cross sectional view of a scintillating crystal and a pair of optical fibers showing possible events when a gamma ray interacts with the crystal.

In any case, when a gamma ray 40 (FIG. 5) strikes the crystal 12, a flash of light consisting of many photons having a wavelength ($\lambda_0$) of about 347 nm are emitted. One such photon 42 is illustrated in FIG. 5. Photons like photon 42 travel through the crystal 12 in many directions, with some going toward one major side surface, and many others going in other directions. A few of these (including the exemplary photon 42) will be waveshifted and re-emitted axially by the fiber bundles 14 and 16 (FIG. 2), and ultimately the event will be recorded by the PMT 18 or other photon detecting device.

The bundle 14 (FIG. 3) is formed of a group of fibers such as fibers 50, 52, 54, and 56. Fibers 50 and 52 are identical and each is tuned by means of its chemical composition to absorb ultra violet light at about 345 nm ($\lambda_0$). Once the fiber 50 (or 52) absorbs the incident ultraviolet radiation, it re-emits photons of a longer wavelength ($\lambda_1$), such as, for example blue light. This re-emission is isotropic, and accordingly, some of the blue photons, for example photon 60 in FIG. 5, are traveling in a direction sufficiently close to parallel to the axis of the fiber 50 to undergo total internal reflection. In FIG. 5, the critical angles for total internal reflection are shown for purposes of illustration as angles 62 and 64 for the fibers 50 and 54, respectively. A photon traveling within the critical angle 62 eventually arrives at the PMT 18 (FIG. 3), and this in turn, generates an electrical signal to indicate that a pulse has been received.

By way of example, the fiber 50 (FIG. 5) may be a conventional plastic optical fiber having a polystyrene core 70 clad with a layer 72 of PMMA and doped with the fluor bis-MSB. This dopant has an absorption peak at 345 nm (ultra violet) and an emission peak at 420 nm (blue). Its absorption peak fits well with the emission peak of the crystal 12 which occurs at 347 nm. Other suitable fibers may be formed of plastic, glass or liquid filled glass capillaries, and other sequences of dopants may be used, as will be apparent to those skilled in the art from the following specification.

Figure 3:
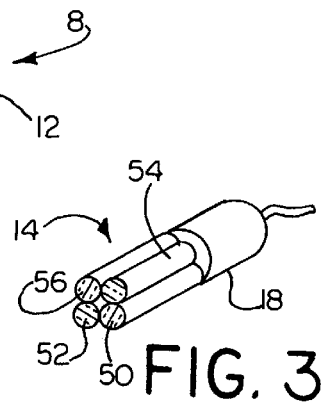
FIG. 3 is an illustration of an end portion of a bundle of optical fibers all of which are connected to a single photo-multiplier tube suitable for use in the detector of FIG. 2.
Figure 4:
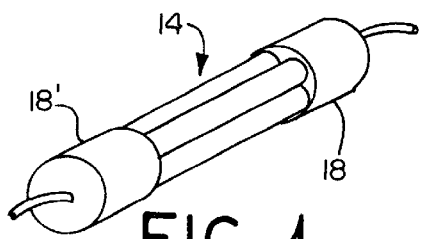
FIG. 4 illustrates a bundle of optical fibers with a photo-multiplier tube at each end and suitable for use in the detector of FIG. 2.

The bundle 14 also includes optical fiber 54 (FIGS. 3 and 5). The fiber 54 is located adjacent to fiber 50 and extends generally parallel to it. The fiber 54 has different optical properties from those of fiber 50. While the fiber 50 absorbed in the ultra violet ($\lambda_0$) and emitted in the blue ($\lambda_1$), effectively shifting the wavelength of the incoming photons to a longer wavelength, the adjacent fiber 54 absorbs photons in the blue portion of the visible spectrum ($\approx \lambda_1$) and re-emits at a longer wavelength ($\lambda_2$), such as the green portion of the visible spectrum. Most of the photons emitted in the blue range by the fiber 50 pass through the walls of that fiber since they are not within the critical angle 62. These, like photon 76, escape the fiber 50 and have a chance of interacting with the secondary fiber 54.

The secondary fiber 54 is tuned by the addition of appropriate dopants to absorb most strongly photons of about the same wavelength as are emitted by the primary fiber 50. For example, the secondary fiber 54 may be the same as the conventional fibers described above but doped with K-27. This dopant has an absorption peak at 427 nm (blue) and an emission peak at 496 nm (green). As a result, some of the (blue) photons ($\lambda_1$) that were not internally reflected by the primary fiber 50 are captured by the secondary fiber 54. One such photon is shown as photon 76 in FIG. 5. Secondary fiber 54 absorbs photon 76 and re-emits a photon at a longer wavelength ($\lambda_2$), for example in the green portion of the visible spectrum. As with the primary fiber 50, the re-emission of the secondary fiber 54 is isotropic, and some of the re-emitted photons, such as photon 78, are traveling in a direction that causes them to be totally internally reflected, and so to reach the PMT 18.

Accordingly, the bundle 14 includes at least two wavelength-shifting optical fibers 50 and 54. The primary fiber 50 shifts the incident light from $\lambda_0$ to $\lambda_1$ and the secondary fiber 54 shifts light from $\lambda_1$ to $\lambda_2$. The secondary wavelength-shifting optical fiber 54 is set along side the primary fiber 50 and receives re-emitted visible photons that escape detection by the primary fiber because the direction in which they were emitted does not permit them to be internally reflected and conducted down the fiber 50 to a detection device such as the PMT 18.

Figure 6:
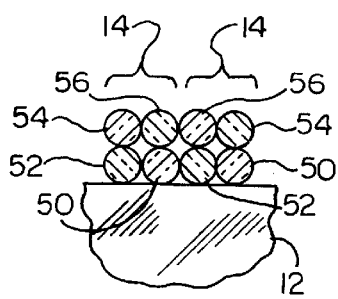
FIG. 6 is a cross sectional view of a portion of the detector of FIG. 5 showing part of the scintillating crystal and an arrangement of optical fibers.

The bundle 14 may also include a third fiber 56 (FIG. 3). This fiber is adjacent to the fiber 54. In the arrangement shown in FIG. 3, two fibers 50 and 52 with an output in the blue portion of the visible spectrum are side by side. These fibers are placed closest to the crystal 12 as shown in FIG. 6. The fibers 54 and 56 are placed directly above the fibers 50 and 52, respectively, as shown in FIGS. 3 and 5. FIG. 5 shows two bundles 14 placed side by side on the crystal 12.

The fiber 54 is similar to the other three, but contains a dopant that causes it to absorb most strongly at the wavelength emitted by fiber 54 ($\lambda_2$) and to re-emit at an even longer wavelength, $\lambda_3$, for example, the orange region of the visible spectrum. Some of those orange photons would reach the PMT 18 (FIG. 3) through total internal reflection.

Figure 7:
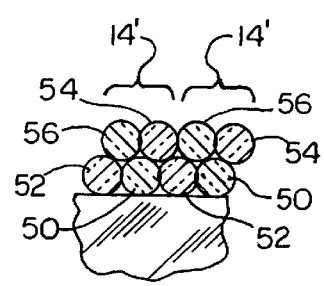
FIG. 7 is a view similar to FIG. 6 but showing another arrangement of optical fibers suitable for use in the present invention.
Figure 8:
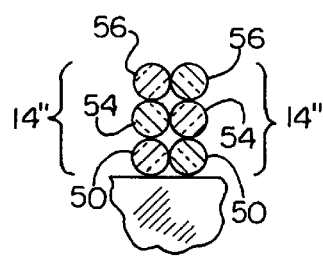
FIG. 8 is a view similar to FIG. 6 but showing yet another arrangement of optical fibers suitable for use in the present invention.

Alternative arrangements and fiber selections are also possible. For example, the fiber 56 could be identical to the fiber 54, or all four of the fibers could be different, each tuned to absorb most strongly at a wavelength at or close to that at which another of the fibers emits. In addition the arrangement of the fibers can be varied. For example, the fibers do not need to be stacked directly over one another as shown in FIG. 6. Instead they could be offset by one fiber radius as shown in FIG. 7 which illustrates two such bundles 14' side by side. This arrangement allows for a denser packing of the fibers. Further, the fibers could be arranged three deep as shown in FIG. 8. In this arrangement, the fiber bundle 14" (FIG. 8) comprises three fibers 50, 54, and 56, each absorbing a portion of the re-emitted photons that escaped the fiber below.

Figure 10:
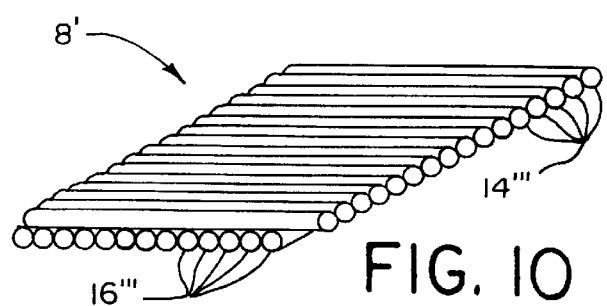
FIG. 10 is a schematic, perspective illustration of a detector formed of the bundles of FIG. 9.

The invention has been described in connection with a crystal 12 (FIG. 2) which emits ultraviolet photons when struck by a gamma ray. These photons are in turn detected by photon detectors 18 connected to the bundles of fibers 14 and 16. It is also possible to combine the functions of the crystal 12 and primary fiber 50. In this case, the primary fiber 100 (FIG. 9) is doped with a fluor that emits ultraviolet photons when struck by a gamma ray. The fiber 100 also includes a fluor that absorbs at the ultra violet and emits at the blue range. (This fluor is often used in scintillating fibers to avoid optical absorption of ultra violet photons by the fiber core material, typically polystyrene.) In such a case, the crystal 12 is eliminated, and the detector 8' (FIG. 10) becomes just a pair of mats of orthogonally arranged bundles 14''' and 16''' of fibers with appropriate photomultiplier tubes.

Figure 9:
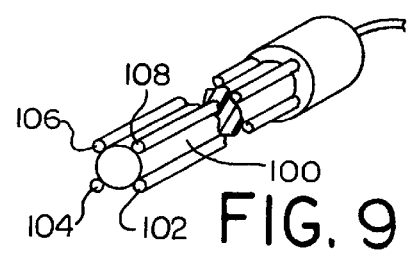
FIG. 9 is a perspective illustration of a bundle of optical fibers connected to a photo-detector for use in practicing the present invention in which one of the fibers includes a scintillating material, the bundle of fibers being provided with a photon detector at one end of the fibers.

As with the embodiments described in connection with FIGS. 6, 7, and 8, there are various arrangements of fibers possible when using the scintillating fiber 100. One such arrangement is illustrated in FIG. 9 where the fiber 100 is surrounded by four additional fibers, 102, 104, 106, and 108. The fibers 102 and 108 may be the same as the fiber 54 of FIG. 3. The fibers 102 and 108 may be tuned to absorb most strongly at the wavelength at which the fiber 100 emits, for example absorbing blue and re-emitting green. The fibers 104 and 106 may be like the fiber 56 of FIG. 3, absorbing most strongly in the green range and re-emitting in the orange range of wavelengths, for example. Of course other selections are possible, including selecting all four fibers 102, 104, 106, and 108 to be the same as fiber 54. This choice would collect more of the photons that escape from the primary fiber 100, but would not collect any of the photons that escape from the secondary fibers.

As shown in FIG. 9, the primary fiber, the scintillating fiber 100, is about twice the diameter of the surrounding fibers 102–108. This is a matter of design choice, and the primary fiber could be larger or smaller. The guiding factors include the need to provide a suitable amount of scintillating material, the stiffness of the resulting fiber (and hence its ease of installation and use), the number of photosensors needed, and the resolution of image required. It is contemplated that a scintillating fiber 100 with about a 1 to 2 mm. diameter could be used with surrounding fibers of about 0.5 mm. diameter.

Figure 11:
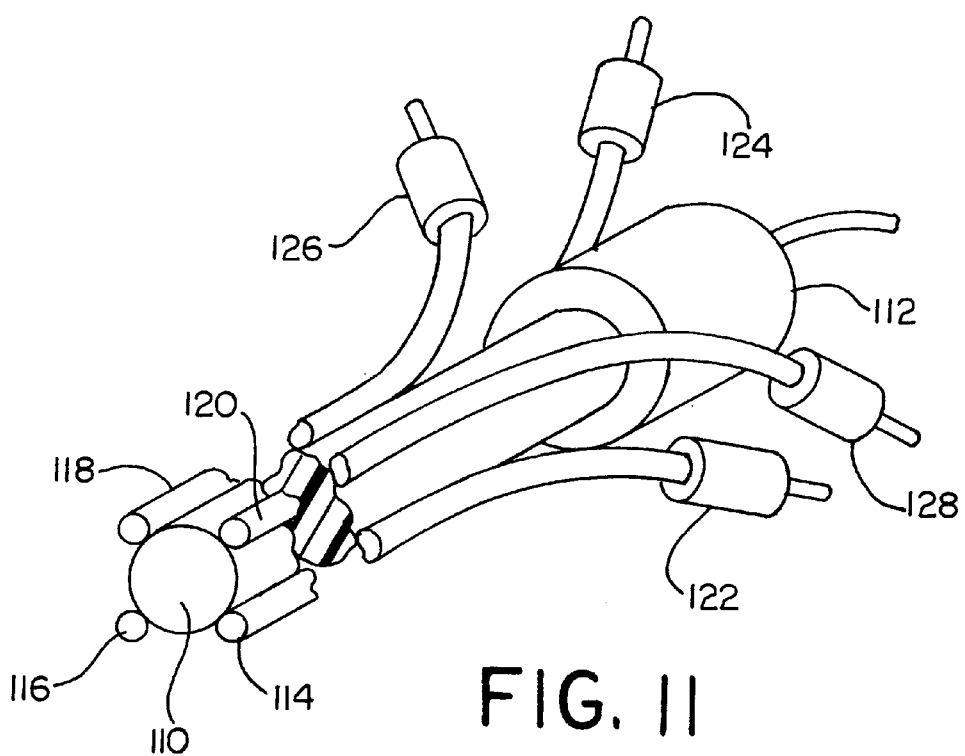
FIG. 11 is a perspective illustration of a bundle of optical fibers like that shown in FIG. 9, but in which each fiber is provided with a separate photon detector.

In addition, all of the embodiments of the invention shown and described above include a single photosensor such as the PMT 18 which receives photons from all the fibers of a bundle 14. It is contemplated that separate photo detectors could be used for each fiber of a bundle, and FIG. 11 illustrates this by way of example as applied to a bundle of fibers like those shown in FIG. 9. In FIG. 11 the scintillating fiber 110 is connected to a PMT 112, while the surrounding fibers 114, 116, 118, and 120 are each connected to a separate PMT, 122, 124, 126, and 128, respectively.

Figure 2:
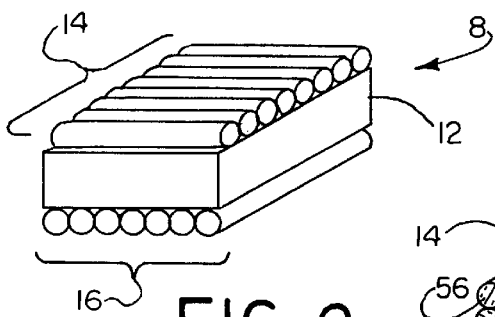
FIG. 2 is a schematic perspective illustration of a detector head suitable for use in the device of FIG. 1 and having orthogonal bundles of optical fibers on opposite sides of a scintillating crystal.

Regardless of whether the scintillating crystal is a large solid as shown in FIG. 2 or its functions are performed by a fluor in the primary fiber 100 as shown in FIG. 9, the resulting detectors 8 and 8' (FIGS. 2 and 10) and camera 10 using such detectors have improved spatial and energy resolution because more photons are captured.

Although the invention has been shown and described with respect to several preferred embodiments, it will be apparent that equivalent alterations and modifications will occur to others skilled in the art upon the reading and understanding of this specification. The present invention includes all such equivalent alterations and modifications, and is limited only by the scope of the following claims.

What is claimed is:

1. A scintillation detector comprising: first and second wavelength-shifting optical fibers, the first fiber absorbing photons at a primary wavelength and re-emitting photons at a secondary wavelength, the secondary wavelength being longer than the primary wavelength, the second fiber absorbing photons at the secondary wavelength and re-emitting photons at a tertiary wavelength, the two fibers being located in close physical proximity so that at least a portion of the photons escaping from the first fiber at the secondary wavelength are absorbed by the second fiber, and a scintillating crystal with a pair of opposite major sides, a plurality of said first and second fibers disposed in close proximity to the crystal, some of said first and second fibers being on one side of the crystal and some of said first and second fibers being on the other side of the crystal.

2. The detector of claim 1 wherein the fibers, when viewed in a direction generally perpendicular to a side of the crystal, form a grid.

3. The detector of claim 1 wherein the major sides of the crystal are bounded by two pairs of opposing parallel edges so as to form a generally planar solid, some of the fibers being parallel to one of the pairs of edges and some of the fibers being parallel to the other of the pair of edges.

4. A scintillation detector comprising: first and second wavelength-shifting optical fibers, the first fiber absorbing photons at a primary wavelength and re-emitting photons at a secondary wavelength, the secondary wavelength being longer than the primary wavelength, the second fiber absorbing photons at the secondary wavelength and re-emitting photons at a tertiary wavelength, the two fibers being located in close physical proximity so that at least a portion of the photons escaping from the first fiber at the secondary wavelength are absorbed by the second fiber, and a third wavelength-shifting optical fiber absorbing photons at the tertiary wavelength and re-emitting photons at a quaternary wavelength, the third fiber being located in close physical proximity to the second fiber so that at least a portion of the photons escaping from the second fiber at the tertiary wavelength are absorbed by the third fiber.

5. The detector of claim 4 including a plurality of said first fibers and a plurality of said second fibers, the first and second fibers being grouped into a plurality of bundles, each bundle including at least one first fiber and one second fiber.

6. The detector of claim 5 wherein the bundles are arranged in two groups with the bundles in one group extending transverse to the bundles in the other group.

7. The detector of claim 2, further including a plurality of second fibers disposed about each first fiber.

8. The detector of claim 4, wherein the first wavelength-shifting optical fiber is a scintillating fiber.

9. The detector of claim 4, wherein the first and second fibers are connected to a single detection unit for detecting photons in the first and second fibers.

10. The detector of claim 4, wherein the first fiber and the second fiber are each connected to its own detection unit for detecting photons in the respective fiber.

11. A method of detecting gamma rays, comprising:
positioning a scintillator to receive gamma rays;
absorbing photons of a first wavelength emitted from the scintillator in a plurality of wavelength-shifting first optical fibers;
absorbing photons of a second wavelength which is longer than the first wavelength in a plurality of wavelength-shifting second optical fibers, each of the second optical fibers being generally parallel to respective of the first optical fibers; and
propagating photons through the first and second optical fibers to a photodetector in response to the absorption of photons by the first and second optical fibers.

12. A radiation detector, comprising:
radiation sensitive material which emits photons upon stimulation by radiation,
a primary set of wavelength shifting optical fibers capable of absorbing photons emitted by the radiation sensitive material and re-emitting photons having a different wavelength, wherein some of the re-emitted photons from the primary set of optical fibers are captured and propagated along the primary set of optical fibers;
a secondary set of optical fibers capable of absorbing photons which have been emitted by the primary set of optical fibers, and which have passed through the primary set of optical fibers and re-emitting photons at a different wavelength, wherein some of the re-emitted photons from the secondary set of optical fibers are captured and propagated down the secondary set of optical fibers, the secondary set of optical fibers being generally parallel to the primary set of optical fibers; and
an electro-optical device positioned to detect photons received from at least one of the fibers of the primary and secondary sets of fibers and to generate an electrical signal in response thereto.

13. The radiation detector of claim 12, wherein the optical fibers are arranged to form bundles comprising at least one fiber of each of the primary set of fibers and one fiber from the secondary set of fibers.

14. The radiation detector of claim 13, wherein each of the bundles of optical fibers has an electro-optical device coupled thereto.

15. The radiation detector of claim 12, wherein the electro-optical device is selected from the group consisting of a photomultiplier tube and a photo diode.

16. The radiation detector of claim 12, wherein each of the primary set and the secondary set of optical fibers have an electro-optical device coupled thereto.

17. The radiation detector of claim 12, wherein the primary set of fibers is disposed in a row and the secondary set of fibers is disposed in a row, the row of the primary set of fibers being disposed between a surface of the radiation sensitive material and the row of the set of secondary fibers.

18. A radiation detector comprising:
radiation sensitive material which emits photons upon stimulation by radiation,
a primary set of wavelength shifting optical fibers capable of absorbing photons emitted by the radiation sensitive material and re-emitting photons having a different wavelength, wherein some of the re-emitted photons from the primary set of optical fibers are captured and propagated along the primary set of optical fibers;
a secondary set of optical fibers capable of absorbing photons which have been emitted by the primary set of optical fibers, and which have passed through the primary set of optical fibers and re-emitting photons at a different wavelength, wherein some of the re-emitted photons from the secondary set of optical fibers are captured and propagated down the secondary set of optical fibers;
a tertiary set of wavelength shifting optical fibers capable of absorbing photons which have been emitted by the secondary set of optical fibers and which have passed through the secondary set of optical fibers and re-emitting photons at a different wavelength from that of the absorbed photons, and, wherein some of the re-emitted photons from the tertiary set of optical fibers are captured and propagated along the tertiary set of optical fibers; and
an electro-optical device positioned to detect photons received from at least one of the fibers of the primary and secondary sets of fibers and to generate an electrical signal in response thereto.

19. The radiation detector of claim 18, wherein the optical fibers are arranged to form bundles comprising one fiber of each of the primary set, the secondary set and the at least one tertiary set of optical fibers.

20. The radiation detector of claim 19, wherein each of the bundles of optical fibers have an electro-optical device coupled thereto.

21. The radiation detector of claim 18, wherein each of the primary set, the secondary set and the at least one tertiary set of optical fibers have an electro-optical device coupled thereto.

22. The radiation detector of claim 18, wherein the primary set of optical fibers is disposed in a row, the secondary set of optical fibers is disposed in a row, and the set of tertiary optical fibers is disposed in a row, the row of the secondary set of fibers being between the row of the primary set of fibers and the row of the tertiary set of fibers and the row of the primary set of fibers being disposed between a surface of the radiation sensitive material and the row of the set of secondary fibers.

23. A gamma camera having a detector assembly for detecting gamma rays, the detector assembly comprising,
a scintillator which receives gamma rays and emits photons in response thereto,
a first optical fiber which receives photons emitted by the scintillator and re-emits photons at a longer wavelength in response thereto, some of the re-emitted photons being propagated along the first optical fiber and some of the re-emitted photons escaping the first optical fiber,
a second optical fiber which receives the re-emitted photons and re-emits photons at a still longer wavelength in response thereto some of which are propagated along the second fiber, and
a photo detector commonly coupled to both the first and second fibers which counts the photons propagated along the first and second fibers.

24. The camera of claim 23 wherein the scintillator is an inorganic crystalline material, and the first fiber is positioned in close proximity to the scintillator.

25. The camera of claim 24 wherein the first optical fiber includes a fluor therewithin.

26. The camera of claim 23 wherein the first and second fibers are grouped into a bundle, and the camera includes a plurality of bundles, the bundles being arranged to define a grid.

27. The detector of claim 23 wherein the second optical fiber is generally parallel to the first optical fiber.

28. A gamma camera having a detector assembly for detecting gamma rays, the detector assembly comprising, a scintillator which receives gamma rays and emits photons in response thereto, a first optical fiber which receives photons emitted by the scintillator and re-emits photons at a longer wavelength in response thereto, some of the re-emitted photons being propagated along the first optical fiber and some of the re-emitted photons escaping the first optical fiber, a second optical fiber which receives the re-emitted photons and re-emits photons at a still longer wavelength in response thereto some of which are propagated along the second fiber, a third optical fiber, the third optical fiber receiving photons which escape from the second optical fiber and re-emitting photons at a still longer wavelength in response thereto, and a photo detector which counts the photons propagated along the first and second fibers, wherein the first and second fibers are grouped into a bundle, and the camera includes a plurality of bundles, the bundles being arranged to define a grid.

29. The camera of claim 28 including a plurality of the third optical fibers and wherein each bundle of optical fibers includes at least one of the third optical fibers.

* * * * *